US009130686B2

(12) United States Patent
Bolton et al.

(10) Patent No.: US 9,130,686 B2
(45) Date of Patent: Sep. 8, 2015

(54) TAGGING OF BROADCAST CONTENT USING A PORTABLE MEDIA DEVICE CONTROLLED BY AN ACCESSORY

(75) Inventors: Lawrence G. Bolton, Fremont, CA (US); Shailesh Rathi, Sunnyvale, CA (US); Jason J. Yew, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1295 days.

(21) Appl. No.: 12/553,958

(22) Filed: Sep. 3, 2009

(65) Prior Publication Data

US 2011/0053491 A1 Mar. 3, 2011

(51) Int. Cl.
*G06F 15/16* (2006.01)
*H04H 60/73* (2008.01)

(52) U.S. Cl.
CPC .................................... *H04H 60/73* (2013.01)

(58) Field of Classification Search
CPC ................................. G06F 7/00; H04H 60/73
USPC ......................................................... 709/230
See application file for complete search history.

(56) References Cited

U.S. PATENT DOCUMENTS 4,977,455 A 12/1990 Young
5,303,393 A 4/1994 Noreen et al.
6,230,205 B1 5/2001 Garrity et al.
6,342,926 B1 1/2002 Hanafee et al.
6,463,469 B1 10/2002 Yavitz
6,473,792 B1 10/2002 Yavitz et al.
6,505,160 B1 1/2003 Levy et al.
6,578,047 B1 6/2003 Deguchi
6,604,072 B2 8/2003 Pitman et al.
6,650,877 B1 11/2003 Tarbouriech et al.
6,674,993 B1 1/2004 Tarbouriech
6,701,060 B2 3/2004 Yuen et al.
6,748,360 B2 6/2004 Pitman et al.

(Continued)

FOREIGN PATENT DOCUMENTS

EP 1220479 A2 7/2002
EP 1367734 A1 12/2003

(Continued)

OTHER PUBLICATIONS

Non-Final Office Action, Mail date Jan. 4, 2011; U.S. Appl. No. 12/693,943, 9 pages.

(Continued)

*Primary Examiner* — Philip Chea
*Assistant Examiner* — Wing Ma
(74) *Attorney, Agent, or Firm* — Blakely, Sokoloff, Taylor & Zafman LLP

(57) ABSTRACT

Track-identifying information can be collected from a broadcast using a portable media device capable of receiving broadcast content in combination with an accessory capable of communicating user input to the portable media player. In some embodiments, the portable media player can detect the presence of track-identifying metadata (a "tag") within a received broadcast and can alert the accessory when a tag is available for a currently-playing track. If the accessory instructs the portable media player to store the tag, the portable media player can do so and can alert the accessory when a tag for a track has been stored. In some embodiments, the accessory can also remotely control other broadcast-receiving functions of the portable media device, such as entering or exiting a broadcast-receiving mode of operation.

24 Claims, 7 Drawing Sheets

(56) References Cited

U.S. PATENT DOCUMENTS

| | | | | |
|---|---|---|---|---|
| 6,941,275 | B1 | 9/2005 | Swierczek | |
| 6,972,698 | B2 | 12/2005 | Deguchi | |
| 6,990,453 | B2 | 1/2006 | Wang et al. | |
| 7,062,528 | B2 | 6/2006 | Deguchi | |
| 7,124,125 | B2 | 10/2006 | Cook et al. | |
| 7,127,154 | B2 | 10/2006 | Son et al. | |
| 7,158,753 | B2 | 1/2007 | Kagan et al. | |
| 7,187,947 | B1 | 3/2007 | White et al. | |
| 7,283,973 | B1 | 10/2007 | Loghmani et al. | |
| 7,293,122 | B1 * | 11/2007 | Schubert et al. | 710/62 |
| 7,343,141 | B2 | 3/2008 | Ellis et al. | |
| 7,441,058 | B1 * | 10/2008 | Bolton et al. | 710/105 |
| 7,526,588 | B1 * | 4/2009 | Schubert et al. | 710/105 |
| 7,529,872 | B1 * | 5/2009 | Schubert et al. | 710/105 |
| 7,613,380 | B2 | 11/2009 | Yanagita | |
| 7,634,605 | B2 | 12/2009 | Laefer et al. | |
| RE41,977 | E * | 11/2010 | Matsumoto et al. | 709/250 |
| 2002/0010759 | A1 | 1/2002 | Hitson et al. | |
| 2002/0012525 | A1 | 1/2002 | Yuen et al. | |
| 2002/0102954 | A1 | 8/2002 | Kaneko | |
| 2002/0132575 | A1 | 9/2002 | Kesling et al. | |
| 2002/0151327 | A1 | 10/2002 | Levitt | |
| 2002/0152874 | A1 | 10/2002 | Vilcauskas et al. | |
| 2002/0183059 | A1 | 12/2002 | Noreen et al. | |
| 2002/0194264 | A1 | 12/2002 | Uchiyama et al. | |
| 2003/0040272 | A1 | 2/2003 | Lelievre et al. | |
| 2003/0151621 | A1 | 8/2003 | McEvilly et al. | |
| 2004/0002310 | A1 * | 1/2004 | Herley et al. | 455/179.1 |
| 2004/0019497 | A1 | 1/2004 | Volk et al. | |
| 2004/0073561 | A1 | 4/2004 | Torres et al. | |
| 2004/0073727 | A1 | 4/2004 | Moran et al. | |
| 2004/0088180 | A1 | 5/2004 | Akins, III | |
| 2004/0127199 | A1 | 7/2004 | Kagan et al. | |
| 2004/0186857 | A1 | 9/2004 | Serlet et al. | |
| 2004/0199432 | A1 | 10/2004 | Iwase et al. | |
| 2004/0218902 | A1 | 11/2004 | Yanagita | |
| 2004/0266336 | A1 | 12/2004 | Patsiokas et al. | |
| 2005/0020223 | A1 | 1/2005 | Ellis et al. | |
| 2005/0181756 | A1 * | 8/2005 | Lin | 455/344 |
| 2006/0069749 | A1 | 3/2006 | Herz et al. | |
| 2006/0184538 | A1 | 8/2006 | Randall et al. | |
| 2006/0184960 | A1 | 8/2006 | Horton et al. | |
| 2006/0187317 | A1 | 8/2006 | Montulli et al. | |
| 2006/0206582 | A1 * | 9/2006 | Finn | 709/217 |
| 2006/0235864 | A1 | 10/2006 | Hotelling et al. | |
| 2007/0028006 | A1 * | 2/2007 | Laefer et al. | 710/1 |
| 2007/0206827 | A1 * | 9/2007 | Tupman et al. | 381/334 |
| 2008/0027573 | A1 * | 1/2008 | Yamamoto et al. | 700/94 |
| 2008/0034129 | A1 * | 2/2008 | Lydon et al. | 710/19 |
| 2008/0040405 | A1 * | 2/2008 | Jung et al. | 707/205 |
| 2008/0082523 | A1 | 4/2008 | Momosaki et al. | |
| 2008/0126191 | A1 | 5/2008 | Schiavi | |
| 2008/0162358 | A1 | 7/2008 | Patsiokas et al. | |
| 2008/0183757 | A1 * | 7/2008 | Dorogusker et al. | 707/104.1 |
| 2008/0188209 | A1 | 8/2008 | Dorogusker et al. | |
| 2009/0034450 | A1 | 2/2009 | Urner | |
| 2009/0062947 | A1 * | 3/2009 | Lydon et al. | 700/94 |
| 2009/0063975 | A1 | 3/2009 | Bull et al. | |
| 2009/0070370 | A1 | 3/2009 | Cunningham et al. | |
| 2009/0100068 | A1 | 4/2009 | Guaba et al. | |
| 2009/0125609 | A1 | 5/2009 | Wood et al. | |
| 2009/0158155 | A1 | 6/2009 | Quinn et al. | |
| 2009/0204640 | A1 * | 8/2009 | Christensen et al. | 707/104.1 |
| 2009/0326949 | A1 | 12/2009 | Douthitt et al. | |
| 2010/0042920 | A1 * | 2/2010 | Sigal | 715/704 |
| 2010/0063931 | A1 * | 3/2010 | Cole et al. | 705/51 |
| 2010/0121741 | A1 | 5/2010 | Hotelling et al. | |
| 2010/0131567 | A1 | 5/2010 | Dorogusker et al. | |
| 2010/0161090 | A1 * | 6/2010 | Smolinski et al. | 700/94 |

FOREIGN PATENT DOCUMENTS

| | | | |
|---|---|---|---|
| EP | 1650971 | A1 | 4/2006 |
| WO | WO 95/00158 | A1 | 1/1995 |
| WO | WO 2005/024818 | A1 | 3/2005 |
| WO | WO 2007/144030 | A1 | 12/2007 |
| WO | WO 2008/074968 | A1 | 6/2008 |

OTHER PUBLICATIONS

Front page of Chicago Bulls website, http://nba.com/bulls/, as of Nov. 8, 2006 captured through Wayback Machine on Dec. 16, 2010; http://web.archive.org/web/20061108221003/http://www.nba.com/bulls/ , 1 page.

First Office Action dated Jan. 18, 2011 for Chinese Patent Application No., (In Chinese Only), 4 pages.

Office Action and Search Report dated May 11, 2011 for Taiwan Intellectual Property Office (IPO), TW Application No. 096149601, (In Chinese Only), 5 pages.

European Patent Office, Examination Report dated Jun. 20, 2011 for EPO Application No. 07 869 685.3, 4 pages.

AT&T Wireless: mMode phones and how to access your music and ringtones [online], [retrieved on Oct. 5, 2005]. Retrived from the Internet <URL:http://www.attwireless.com/personal/features/fun/musichowto.jhtml>, pp. 1-3.

Brodia, "How to Do Everything With Your Zune," 1st Ed., Jul. 2007, pp. 71-73.

Griffin 4020TALK—iTalk Voice Recorder for iPod, product description, Electronic Express [online], [retrieved on Jun. 18, 2006]. Retrieved from the Internet <URL: http://www.electronicexpress.com/product?prod_id=7464>.

Griffin—radio SHARK, product information sheet, Griffin Technology, [online], [retrieved Jun. 18, 2006]. Retrieved from the Internet <URL: http://www.griffintechnology.com/products/radioshark>.

MacXM Features [online], [retrieved on Apr. 11, 2005]. Retrieved from the Internet <URL: http://macxm.sourceforge.net/features.html>, 1 page.

MacXM Screenshots [online], [retrieved on Apr. 11, 2005]. Retrieved from the Internet <URL: http://macxm.sourceforge.net/shots.html> pp. 1-2.

MacXM FAQs [online], [retrieved on Apr. 11, 2005]. Retrieved from the Internet <URL: http://macxm.sourceforge.net/faq.html>, pp. 1-6.

Menta et al., "Review: Neuros MP3 Digital Audio Computer," [online], [retrieved on May 4, 2005]. Retrieved from the Internet <URL: http://www.mp3newswire.net/stories/2003/neuros.html>.

Microsoft Zune—Ars Technica, by Nate Anderson, last updated Nov. 15, 2006, [online], six parts, 18 pages [retrieved on Mar. 19, 2009]. Retrieved from the Internet <URL: http://arstechnica.com/hardware/reviews/2006/11/zune.ars>.

Miller et al, "Audio Fingerprinting: Nearest Neighbor Search in High Dimensional Binary Spaces," IEEE Multimedia Signal Processing Workshop 2002, St. Thomas, U.S. Virgin Islands, pp. 1-4.

Neuros MP3 Digital Audio Computer [online], [retrieved Nov. 8, 2004]. Retrieved from the Internet <URL: http://www.neurosaudio.com>, pp. 1-2.

Neuros User's Guide, 2nd Edition, Neuros Audio, LLC.,Chicago, IL, pp. 1-25.

Philips Research, "Content Identification Audio Fingerprinting Technology," [online], [retreived on Sep. 29, 2004]. Retrieved from the Internet <URL: http://www.research.philips.com/initiatives/contentid/audiofp.html>, 5 pages.

RepliCheck How It Works, Audible Magic Corporation [online], [retrieved on Sep. 29, 2004]. Retrieved on the Internet <URL: http://www.replicheck.com/how_it_works.html>, pp. 1-4.

Schwarz, SchwarzTech Review: Griffin iTalk [online], [retreived on Jun. 18, 2006]. Retrieved from the Internet <URL: http://schwarztech.us/reviews/italk.shtml>.

Shazam Technology, Shazam Entertainment Ltd. [online], [retrieved Sep. 29, 2004]. Retrieved from the Internet <URL: http://www.shazamentertainment.com/technology.shtml>, 2 pages.

Shazam Mobile Products & Services, Shazam Entertainment Ltd. [online], [retrieved Apr. 29, 2004]. Retrieved from the Internet <URL: http://www.shazamentertainment.com/products.shtml>, 2 pages.

(56) References Cited

OTHER PUBLICATIONS

Sony device bookmarks music heard on radio—CNET News, by Ian Fried, dated Jun. 9, 2000, [online], [retrieved Mar. 19, 2009]. Retrieved from the Internet <URL: http://news.cnet.com/2100-1040-241675.html>.
UBC Media Group—Radio Stations News, dated Dec. 13, 2007, [online], [retrieved on Mar. 19, 2009]. Retrieved on the Internet URL: http://www.ubcmedia.com/pressview.php?ID=157>.
UBC Media Group—Group News, dated Jun. 25, 2007, [online], [retrieved on Mar. 19, 2009]. Retrieved on the Internet <URL: http://www.ubcmedia.com/pressview.php?ID=110>.
Examiner's First Report dated May 31, 2010 for Australian Patent Application No. 2007336816, 2 pages.
First Office Action dated May 27, 2010 for Chinese Patent Application No. 200780047063.0, 21 pages.
Examination Report under Section 18(3) dated Jul. 1, 2010 for Great Britain Application No. GB0911578.3, 3 pages.

* cited by examiner

400

| Command | Direction | Payload |
|---|---|---|
| SetNotify | A → P | bitmask |
| EventNotify | P → A | notification message |
| RadioButtonStatus | A → P | bitmask |
| EnterRadioMode | A → P | none |
| ExitRadioMode | A → P | none |

TAGGING OF BROADCAST CONTENT USING A PORTABLE MEDIA DEVICE CONTROLLED BY AN ACCESSORY

CROSS-REFERENCES TO RELATED APPLICATIONS

The present application is related to commonly-assigned, co-pending U.S. patent application Ser. No. 12/553,850, filed of even date herewith, the disclosure of which is incorporated herein by reference in its entirety.

The present application is also related to commonly-assigned, co-pending, U.S. patent application Ser. No. 11/961,904, filed Dec. 20, 2007, the disclosure of which is incorporated herein by reference in its entirety.

BACKGROUND

The present disclosure relates generally to portable media players with broadcast-receiving capability and in particular to communicating tagging status information between a portable media player and an accessory.

Users listen to or watch broadcast media in a variety of contexts. For example, it is common to listen to the radio while driving or doing chores or the like. During such listening, the user may hear a song he or she likes but might not hear or be able to remember the title of the song or the name of the artist. Further, even when the identifying information is provided, the user might not have ready access to a pen or paper to write down the information and might not be able to remember it later. This can make it difficult for users who want to acquire interesting information (e.g., purchasing a song or pursuing other information related to or referred to in the broadcast) to locate the content later.

In the case of music broadcasts (e.g., radio), various services have sprung up to assist users in identifying songs they hear. For example, radio stations maintain play lists indicating what songs were played when, and some services make these lists available to users. If the user knows which station he or she was listening to and the time when the song was played, the play list can be searched to identify the song. Other services identify songs from recorded segments in analog or digital formats. For example, a user with a mobile phone who hears a song playing in a shop can invoke a service and allow the service to "hear" a portion of the song. The service analyzes the sounds and identifies the song. Other services allow a user to send a digital recording (e.g., in MP3 format) of a segment of the song via the Internet or other digital data network; the service analyzes the digital recording and identifies the song.

These services are not always reliable. In the case of playlists, the user must remember the station identifying information (e.g., frequency or call letters) and the date and time. In the case of sample matching, the matching can be error-prone, particularly if the quality of the recording or live sound is poor.

BRIEF SUMMARY

Certain embodiments of the present invention facilitate collection of track-identifying information from a radio broadcast using a portable media device and an accessory device (or "accessory") capable of communicating user input to the portable media player. In some embodiments, the portable media player can receive broadcast content, detect the presence of track-identifying metadata (referred to herein as a "tag") within the broadcast content stream, and alert the accessory when a tag is available for a currently-playing track. If the accessory instructs the portable media player to store the tag, the portable media player can do so and can alert the accessory when a tag for a track has been stored. In some embodiments, the accessory can also remotely control other tuner functions of the portable media device, such as entering or exiting a radio mode of operation.

In some embodiments, an accessory communicatively coupled to the portable media device can receive a tag notification from the portable media device, the tag notification indicating that track identification information is available for a currently playing track. The accessory can also receive a tag request signal indicative of a user request to tag the track and transmitting a tagging command to the portable media device to instruct the portable media device to store the track identification information.

The tagging command can be implemented, for example, using a "button status" command that includes a button status bitmask, with different bits of the button status bitmask corresponding to different functions associated with receiving broadcasts. One of the bits of this command can correspond to an instruction to store track identifying metadata, while other bits correspond to other radio functions (e.g., changing station, changing volume, etc.).

The tag notification can be implemented, for example as a notification command that can be sent by the portable media device and received by the accessory. The notification command can be sent with different event identifiers to indicate the particular event; in addition to the availability of track identification information, other events can include successful storage of the track identification information, unsuccessful storage of the track identification information, the beginning of a new track, changing the radio station or program tuned to, entering or exiting radio mode, and so on. Various notifications and combinations of notifications are possible. In some embodiments, an accessory can register for a desired class of notifications, such as radio-related notifications, and receive only notifications in the classes for which the accessory has registered.

The following detailed description together with the accompanying drawings will provide a better understanding of the nature and advantages of the present invention.

DETAILED DESCRIPTION

Certain embodiments of the present invention facilitate collection of track-identifying information from a radio broadcast using a portable media device and an accessory device (or "accessory") capable of communicating user input to the portable media player. In some embodiments, the portable media player can receive broadcast content, detect the presence of track-identifying metadata (referred to herein as a "tag") within the broadcast content stream and can alert the accessory when a tag is available for a currently-playing track. If the accessory instructs the portable media player to store the tag, the portable media player can do so and can alert the accessory when a tag for a track has been stored. In some embodiments, the accessory can also remotely control other tuner functions of the portable media device, such as entering or exiting a radio mode of operation.

Figure 1:
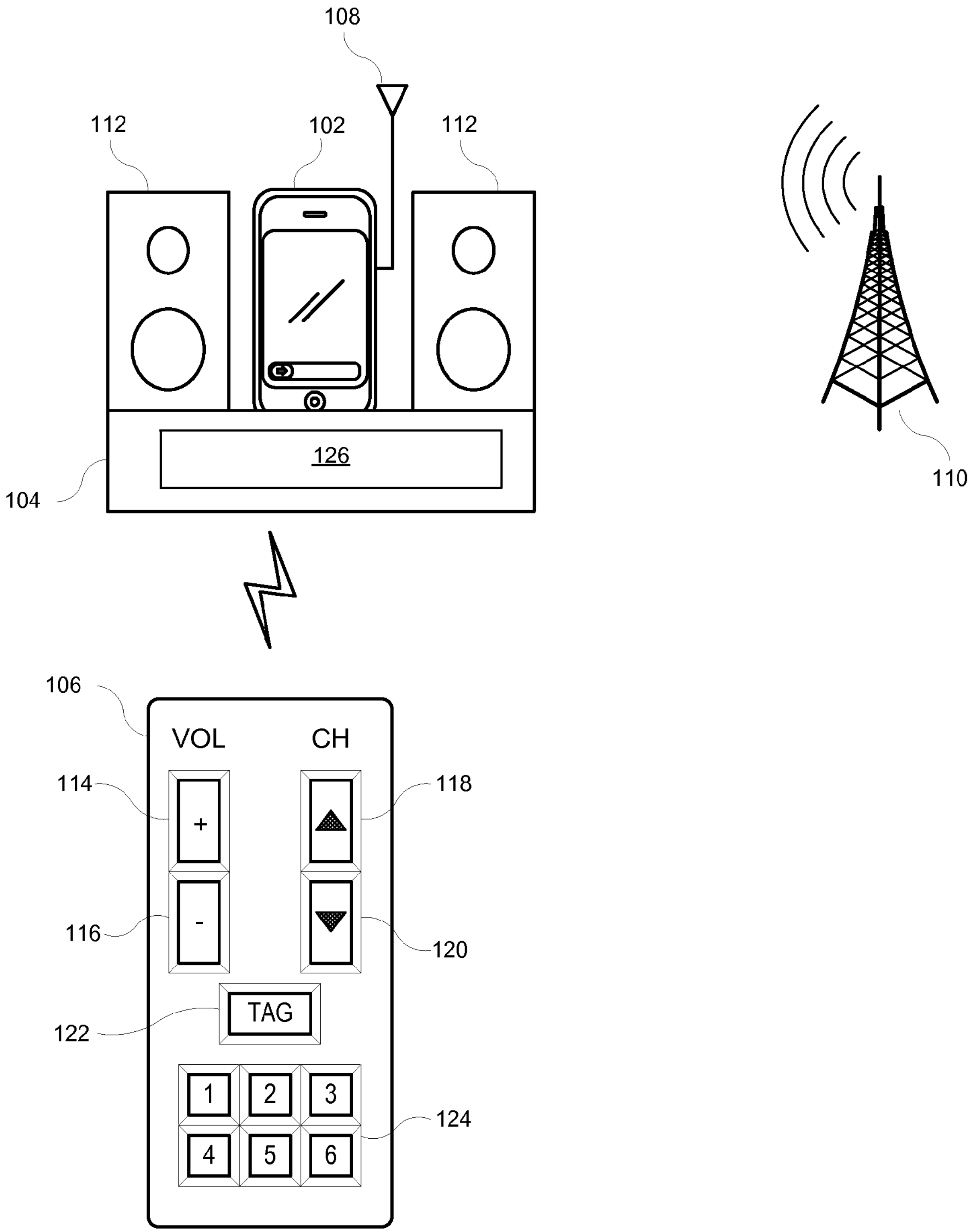
FIG. 1 illustrates a system according to an embodiment of the present invention.

FIG. 1 illustrates a system 100 according to an embodiment of the present invention. System 100 includes a portable media device (PMD) 102 connected to an accessory 104, which in this example is a speaker dock. Accessory 104 communicates wirelessly with remote control 106, e.g., via infrared signaling or other short-range wireless signals.

PMD 102 incorporates a radio frequency (RF) antenna 108 and supporting RF tuner circuitry (not explicitly shown) that allow PMD 102 to receive radio broadcasts, e.g., from radio transmitter 110, which can be, e.g., a terrestrial or satellite transmitter operating in any RF band including but not limited to AM, FM, and satellite bands. While antenna 108 is shown as being external to PMD 102, it is to be understood that this is not required, and antenna 108 can be internal to PMD 102. In some embodiments, antenna 108 can be an attachable device and can also provide dual functions. For example, an antenna input port can be incorporated into a headphone jack, allowing a user to connect PMD 102 to any suitable antenna, and in some embodiments, a headphone wire may be leveraged as an antenna to improve reception of radio signals without a separate external antenna. In some embodiments, PMD 102 can include additional functionality, such as the ability to store media content and to play back stored content in response to user instructions, as well as functionality unrelated to media content (e.g., communication capability via mobile telephone and/or data networks, navigation capability using Global Positioning System satellite data or the like, personal information management, and so on).

Accessory 104 includes an electrical connection (not explicitly shown) to PMD 102, allowing PMD 102 to provide audio signals in digital and/or analog format to accessory 104 and allowing communication of various control signals as described below between PMD 102 and accessory 104. Accessory 104 can include speakers 112. When PMD 102 is docked to accessory 104, radio broadcasts can be played for a user via speakers 112.

Remote control 106 communicates wirelessly with accessory 104. As shown, remote control 106 can include a number of control buttons that allow a user to communicate instructions to accessory 104. Accessory 104 can relay these instructions to PMD 102, thereby allowing a user to control radio playing and/or other functions of PMD 102. In the example shown, remote control 106 provides buttons 114, 116 for volume control; buttons 118, 120 for changing the station; a "tag" button 122 for instructing PMD 102 to store track-identifying information, e.g., as described below; and a group of preset buttons 124 that can be associated with stations the user likes. In some embodiments, accessory 104 can receive user input directly via its own user interface, e.g., using controls (not explicitly shown) on front panel 126, in addition to or instead of receiving input from remote control 106.

It will be appreciated that the system configuration of FIG. 1 is illustrative and that variations and modifications are possible. PMD 102 can be made in a variety of form factors and configurations and may be able to receive radio broadcasts in a variety of formats (including analog, digital, and hybrid digital) from a variety of sources (including terrestrial and satellite broadcasts). Further, while "radio" generally refers to an audio broadcasting medium, it is to be understood that other types of media (e.g., video) can also be broadcast; accordingly, a "tuner" (or "RF tuner") as used herein can also include a television tuner or the like. In addition, in some embodiments PMD 102 may be able to stream broadcast content (including audio and/or video) from a data network such as the Internet using a wired or wireless connection. In addition, PMD 102 can receive broadcasts without having a built-in tuner. For example, in some embodiments, PMD 102 can connect to an external tuner (which can be in accessory 104 or another device) and receive broadcast content, e.g., in digital and/or analog formats, via the external tuner.

Accessory 104 is just one example of a range of accessories to which PMD 102 can be connected; in general, the term "accessory" includes any electronic device capable of communicating control signals and information with a PMD. Examples of such communication are described below.

Figure 2:
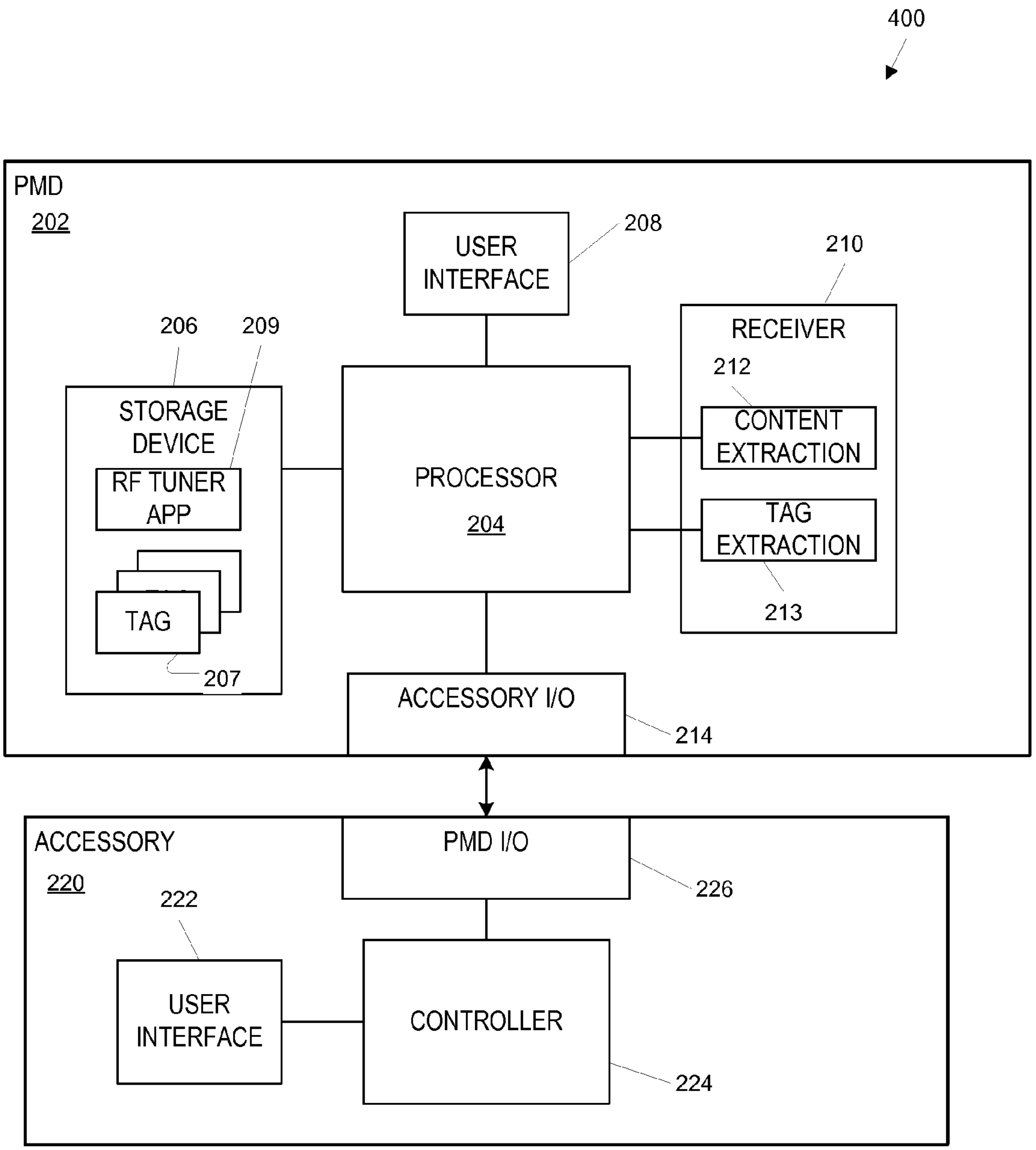
FIG. 2 is a block diagram of a system according to an embodiment of the present invention.

FIG. 2 is a block diagram of system 200 according to an embodiment of the present invention. System 200 includes PMD 202 (e.g., implementing PMD 102 of FIG. 1) and accessory 220 (e.g., implementing accessory 104 of FIG. 1).

PMD 202 in this embodiment can provide capability to play radio broadcasts and/or stored media content. PMD 202 can include processor 204, storage device 206, user interface 208, receiver 210, and accessory input/output (I/O) interface 214. PMD 202 can also include other components (not explicitly shown) to provide various enhanced capabilities. For example, in some embodiments PMD 202 can include transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), a GPS receiver, and/or other components.

Storage device 206 can be implemented, e.g., using disk, flash memory, or any other non-volatile storage medium. In some embodiments, storage device 206 can store media assets such as audio, video, still images, or the like, that can be played by PMD 202, as well as program code (e.g., a music player application program) that permits a user to interact with stored media assets. Storage device 206 can also store tags 207 associated with broadcast content previously heard by the listener. Each tag can include identifying metadata for a particular track, such as the track title, artist name, album name, name of the station that played the track, time and date when the tag was stored, a unique track identifier associated with a media asset purchase system, and any other information. Further examples of tag content and data structures that can be used to store tags are described in above-referenced application Ser. No. 11/961,904.

Storage device 206 can also store other information such as a user's contacts (names, addresses, phone numbers, etc.); scheduled appointments and events; notes; and/or other personal information. In some embodiments, storage device 206 can store one or more application programs to be executed by processor 204, including RF tuner application program 209, which in this embodiment allows a user to control radio playback by PMD 202. Storage device 206 can also store other application programs including but not limited to video game programs, personal information management programs, etc.

User interface 208 may include input devices such as a touch pad, touch screen, scroll wheel, click wheel, dial, button, switch, keypad, microphone, or the like, as well as output devices such as video screen, indicator lights, speakers, headphone jacks, or the like, together with supporting electronics (e.g., digital-to-analog or analog-to-digital converters, signal processors, or the like). A user can operate input devices of user interface 208 to invoke the functionality of PMD 202 and can view and/or hear output from PMD 202 via output devices of user interface 208.

Processor 204, which can be implemented as one or more integrated circuits (e.g., a conventional microprocessor or microcontroller), can control the operation of PMD 202. In various embodiments, processor 204 can execute a variety of programs in response to program code and can maintain multiple concurrently executing programs or processes. At any given time, some or all of the program code to be executed can be resident in processor 204 and/or in storage media such as storage device 206.

Through suitable programming, processor 204 can provide various functionality for PMD 202. For example, in response to user input signals provided by user interface 208, processor 204 can operate a database engine to navigate a database of media assets stored in storage device 206 in response to user input and display lists of selected assets. Processor 204 can respond to user selection of an asset (or assets) to be played by transferring asset information to a playback engine also operated by processor 204, thus allowing media content to be played. In another example, processor 204 can be programmed (e.g., via RF tuner application 209) to allow a user to control receiver 210. RF tuner application 209 can define a user interface that allows a user to locate or select a radio station or program to listen to, to control volume and other characteristics of the sound, and to capture identifying information about currently playing content. In various embodiments, processor 204 can also operate other programs to control other functions of PMD 202.

Receiver 210 can be used to receive broadcasts via one or more media; any broadcast medium or combination of media can be supported. In some embodiments receiver 210 can include an RF tuner that, in conjunction with a suitable antenna (not explicitly shown), can be capable of detecting broadcasts via a wireless medium (e.g., FM or AM radio in standard and/or HD formats, over-the-air TV, satellite TV or radio, WiFi, cellular communication network, etc.). Receiver 210 may include any hardware and/or software elements usable to extract broadcast data from wired and/or wireless media as desired; the particular components will depend on the medium (or media) supported Any combination or subcombination of wired and/or wireless media can be supported. In some embodiments, receiver 210 can be capable of receiving broadcast content that is streamed to PMD 202 via accessory I/O interface 214 or another interface (not shown). For example, radio, television or other media broadcasts can be received by an external tuner that streams the broadcast content in analog and/or digital form to receiver 210. Such an external tuner can be located in accessory 220 or in another device (not shown) communicatively coupled to PMD 202. In some embodiments, PMD 202 can communicate control information to the external tuner, and RF tuner app 209 can allow a user to control the external tuner via user interface 208. (Examples of a PMD controlling an external tuner can be found in U.S. Pat. No. 7,441,058, issued Oct. 21, 2008; other techniques can also be used.)

Receiver 210 can include content extraction engine 212, which can incorporate appropriate decoding and processing components to extract audio and/or video signals from a received broadcast; these components can generate analog and/or digital signals suitable for driving video and/or audio output devices (not explicitly shown in FIG. 2), such as display devices and/or speakers. Such output devices can be components of user interface 208. In addition or instead, PMD 202 can deliver these signals to accessory 220 via accessory I/O interface 214.

Receiver 210 can also include tag extraction engine 213, which can incorporate appropriate decoding and processing components to extract embedded metadata from the received broadcast. Metadata can be embedded in a radio broadcast using various techniques, including but not limited to existing standards such as Radio Data System (RDS)/Radio Broadcast Data System (RBDS), which can be used to embed metadata in analog radio broadcasts, and/or Station Information Service (SIS) and Program Service Data (PSD), which are based on IBOC Digital Radio Broadcasting Standard NRSC-5 or NRSC-5A and can be used for digital or hybrid digital (HD) radio; other techniques can also be used and tag extraction engine 213 can be configured accordingly. In some embodiments, tag extraction engine 213 can extract the available metadata as it is received and can alert RF tuner application 209 executing on processor 204 when track identifying metadata is available. In turn, RF tuner application 209 can receive a user request to tag the track (i.e., store all or part of the metadata) and can respond to the request by transferring some or all of the metadata for the track from tag extraction engine 213 to storage device 206, thereby creating a new tag 207.

Accessory I/O interface 214 can allow PMD 202 to communicate with various accessories. For example, accessory I/O interface 214 might support connections to a computer, an external speaker dock (e.g., as shown in FIG. 1), or the like. In accordance with some embodiments of the invention, accessory I/O interface 214 can be used to receive instructions related to tagging of tracks from accessory 220 and to notify accessory 220 of changes in status of RF tuner application 209 during execution thereof.

In some embodiments, accessory I/O interface 214 can include a connector, such as a 30-pin connector corresponding to the connector used on iPod® and iPhone® products, as well as supporting circuitry. The connector can provide connections for power and ground as well as for various wired communication interfaces such as USB, FireWire, and/or universal asynchronous receiver/transmitter (UART). In addition or instead, accessory I/O interface can include a wireless interface such as Bluetooth (i.e., an interface compliant with a Bluetooth® specification (e.g., Bluetooth specification v2.1+EDR; other versions can also be used) promulgated by the trade association Bluetooth SIG, Inc. (headquartered in Bellevue, Wash.)). Other wireless protocols can also be supported. Thus, accessory I/O interface 214 can support multiple communication channels including wired and/or wireless channels, and a given accessory can use any or all of these channels.

Accessory 220 includes controller 224, user interface 222, and PMD I/O interface 226. Accessory 220 is representative of a broad range of electronic devices to which PMD 202 can be connected, and it is understood that such devices can vary widely in capability, complexity and form factor. Various accessories may include components not shown in FIG. 2, including but not limited to storage devices (disk, memory, etc.); display devices, speakers, and/or ports for connecting to external speakers and/or to display devices; microphones for recording audio (either alone or in connection with video recording); and so on.

Controller 224 can include, e.g., a microprocessor or microcontroller executing program code to perform various functions associated with accessory 220. For example, in some embodiments where accessory 220 incorporates a sound system (e.g., speaker dock 104 in FIG. 1), program code executed by controller 224 can include programs for digital audio decoding, analog or digital audio processing, and the like. As another example, controller 224 can execute program code to interpret user input and send corresponding information to PMD 202 and/or to interpret information received from PMD 202 and provide corresponding output, as described below.

User interface 222 may include input controls such as a touch pad, touch screen, scroll wheel, click wheel, dial, button, switch, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 222 to invoke the functionality of accessory 220 and can view and/or hear output from accessory 220 via user interface 222. In some embodiments, user interface 222 can include a wireless (e.g., infrared) receiver that receives control signals from a remote control (e.g., remote control 106 of FIG. 1).

PMD I/O interface 226 can allow accessory 220 to communicate with PMD 202 (or another PMD). In some embodiments, PMD I/O interface 226 can include a connector that mates directly with a connector included in PMD 202, such as a 30-pin connector that mates with the connector used on various iPod® products. Such a connector can be used to supply power to PMD 202 or receive power from PMD 202, to send and/or receive audio and/or video signals in analog and/or digital formats, and to communicate information via various interfaces such as USB, UART, and/or FireWire. Other connectors may also be used; for example, PMD I/O interface can incorporate a standard USB connector and can connect to accessory I/O interface 214 of PMD 202 via an adapter cable. In other embodiments, PMD I/O interface 226 can communicate wirelessly (e.g., using Bluetooth) with accessory I/O interface 214, and no physical contact is required.

Accessory 220 can be any electronic device that interacts with PMD 202. In some embodiments, accessory 220 can provide remote control over operations of PMD 202, such as operations related to tagging of tracks, examples of which are described further below. Accessory 220 in various embodiments can control any function of PMD 202 and can also receive media content from PMD 202 and present such content to the user (e.g., through audio speakers and/or video display screen, depending on the type of media content).

It will be appreciated that the system configurations and components described herein are illustrative and that variations and modifications are possible. The PMD and/or accessory may have other capabilities not specifically described herein (e.g., mobile phone, global positioning system (GPS), broadband data communication, Internet connectivity, etc.).

Further, while the PMD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 214 of PMD 202 and PMD I/O interface 226 of accessory 220 allow PMD 202 to be connected to accessory 220 and subsequently disconnected from accessory 220. As used herein, PMD 202 and accessory 220 are "connected" whenever a communication channel is open between PMD I/O interface 226 and accessory I/O interface 214. Such connection can be achieved via direct physical connection, e.g., with mating connectors; indirect physical connection, e.g., via a cable; and/or wireless connection, e.g., via Bluetooth.

In some embodiments, PMD 202 and accessory 220 can communicate while connected by exchanging commands and data according to a PMD-specific protocol. The commands and data can be communicated, e.g., using any wired or wireless transport medium provided by accessory I/O interface 214 and PMD I/O interface 226. The PMD-specific protocol defines a format for messages to be exchanged between PMD 202 and accessory 220. For instance, the PMD-specific protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The PMD-specific protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all PMDs to which an accessory can be connected, support every lingo defined within the accessory protocol.

In some embodiments, every accessory 220 and every PMD 202 that use the PMD-specific protocol support at least a "general" lingo that includes commands common to all such devices. The general lingo can include commands enabling the PMD and the accessory to identify and authenticate themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) may be blocked from invoking certain (or all) commands or lingoes if the authentication is unsuccessful.

In some embodiments the general lingo can also provide a notification capability. For example, PMD 202 can generate notifications in response to various events that change the status of PMD 202, such as launching or exiting various applications (e.g., RF tuner application 209), changing state within an application (e.g., when a new track begins playing during a broadcast or when a new tag 207 is stored in storage device 206), and so on. Accessory 220, when connected to PMD 202, can "register" to receive all notifications or selected classes of notifications by sending a registration command to PMD 202; an example is described below. Once accessory 220 has registered for a particular class (or classes) of notifications, PMD 202 automatically begins to send notifications to accessory 220 whenever any event within the registered class(es) occurs. Notification conveniently allows accessory 220 to maintain current information about the status of PMD 202 without having to send requests for status information.

A PMD-specific protocol can also include various other lingoes, such as a simple remote lingo that allows accessory 220 to send a command indicating a function of PMD 202 to be invoked, a remote user interface lingo that can be used to communicate commands and data related to replicating all or part of a user interface of PMD 202 on accessory 220 (thereby supporting a more advanced remote control), a tuner lingo that allows a user to control a tuner in PMD 202 by operating accessory 220 and/or to control a tuner in accessory 220 by operating PMD 202, a storage lingo that allows accessory 220 to store data on PMD 202, and so on. Any lingo or combination of lingoes or other commands or groups of commands can be used in connection with a PMD-specific protocol.

Figures 3, 4:
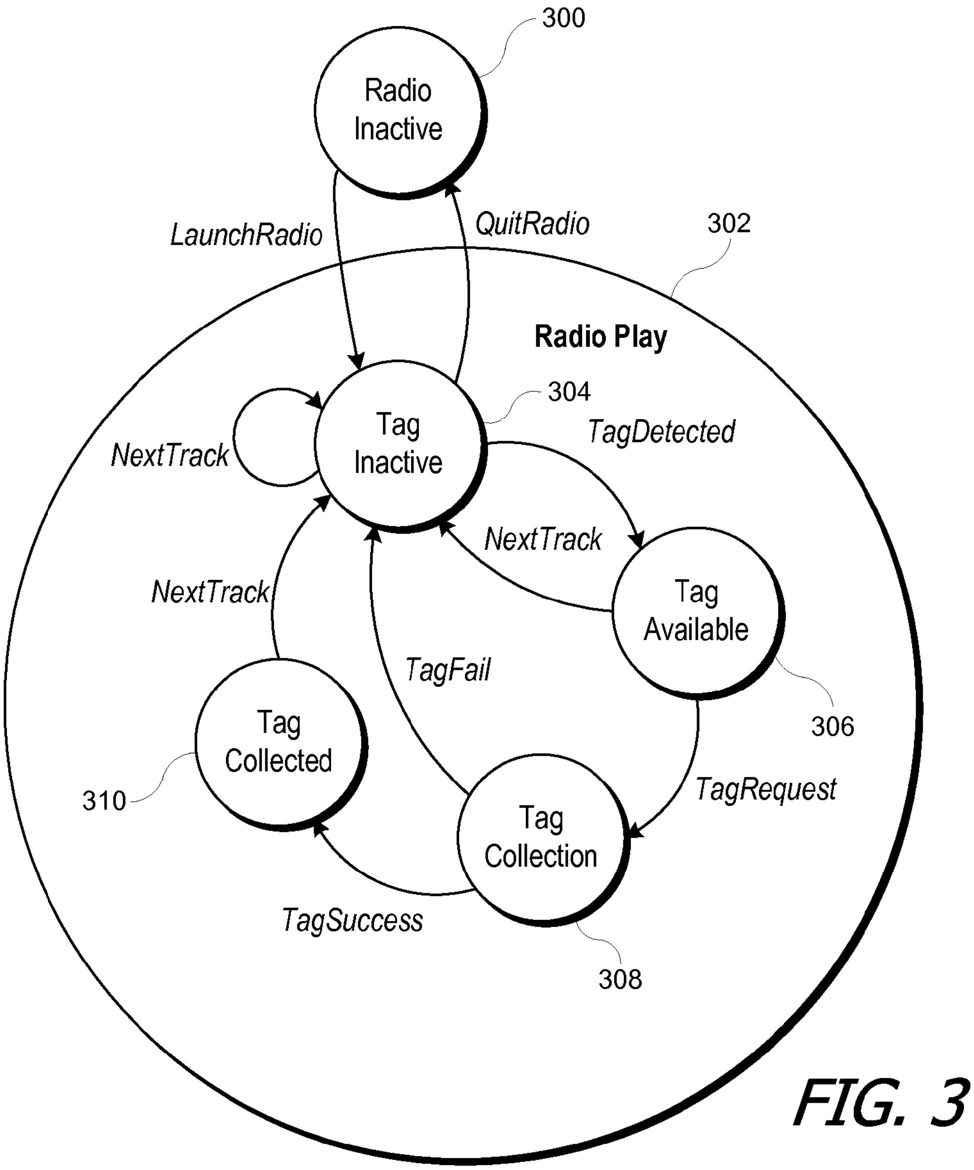
FIG. 3 is a simplified state diagram for a portable media device (PMD) illustrating aspects of operation of an RF tuner application according to an embodiment of the present invention.
FIG. 4 is a table showing commands that can be implemented in a PMD-specific communication protocol according to an embodiment of the present invention FIGS. 5A-5B together provide a flow diagram of a process for controlling radio tagging by a PMD using an accessory according to an embodiment of the present invention.

FIG. 3 is a simplified state diagram for PMD 202 illustrating aspects of operation of RF tuner application 209 according to an embodiment of the present invention. Initially, PMD 202 is in Radio Inactive mode 300. When a "LaunchRadio" event occurs, PMD 202 transitions to Radio Play mode 302. In some embodiments, the LaunchRadio event can occur in response to any user input indicating that the user desires to listen to the radio. For example, the user may activate a radio icon on a graphical user interface of PMD 202 or operate a control of accessory 220 that causes accessory 220 to send a command to PMD 202 to launch RF tuner application 209. Launching RF tuner application 209 can include exiting or disabling other applications that produce audio output, such as an application for playing stored media.

In Radio Play mode 302, PMD 202 can receive user input to select a radio band (e.g., FM, AM, satellite, etc.), tune to a particular station or program within a selected band, change the volume, and the like. In the interest of focusing the present description, these details are not shown.

As illustrated in FIG. 3, Radio Play mode 302 incorporates a number of different states related to tagging of tracks. As used herein, a "track" refers generally to a subset of the broadcast content that is logically regarded as a unit. For example, each song played by a radio station can be a track. A broadcast advertisement can also be a track. A program such as a talk show can be treated as a single track or divided into multiple tracks, e.g., based on the topics covered, the segmentation of the program due to advertisements, or the like. In some instances, an entire broadcast (e.g., a podcast) may be identified as a single track. In some embodiments, a track can be identified based on metadata created and embedded in the broadcast, e.g., by an originator of the broadcast; when some or all of the metadata changes, a new track is indicated.

PMD 202 in some embodiments can detect when tracks begin and determine whether a tag (track-identifying metadata) is available for the track. More specifically, upon entry into Radio Play mode 302, PMD 202 can enter the Tag Inactive state 304. At this stage, no metadata is available for a current track, but content extraction engine 212 can be extracting content for playback from the received broadcast. The content can be delivered to speakers of PMD 202 and/or delivered in analog or digital form to accessory 220 via accessory I/O interface 214. Thus, a user can listen to radio content via accessory 220.

Tag extraction engine 213 can operate at the same time as content extraction engine 212 to detect track-identifying metadata. If such metadata is detected, a "TagDetected" event can occur, causing PMD 202 to transition to Tag Available state 306. If a request to store a tag is received while in Tag Available state 306, a "TagRequest" event can occur, causing PMD 202 to transition to Tag Collection state 308. In Tag Collection state 308, the tag information extracted by tag extraction engine 213 can be stored as a tag 207 in storage device 206. Successful storage can result in a "TagSuccess" event and a transition to Tag Collected state 310. If storage fails, the "TagFail" event can result in a transition back to Tag Inactive state 304 and, in some embodiments, in an error message to the user.

At the end of a track, the state is either Tag Collected state 310, Tag Available state 306, or Tag Inactive state 304. The end of a track (or beginning of the next track) while in any of these states can correspond to a "NextTrack" event, which can cause a transition to Tag Inactive state 304. End of a track (or beginning of the next track) can be detected, e.g., by tag extraction engine 213 detecting a change in the track-identifying metadata or receiving new track identifying metadata. A NextTrack event can also occur, e.g., if receiver 210 switches to a new station or program.

PMD 202 can continue in Radio Play mode 302, playing and potentially tagging any number of tracks, until the radio application quits ("QuitRadio" event), e.g., in response to user input. The QuitRadio event results in a transition back to Radio Inactive mode 300. In some embodiments, if PMD 202 was providing other forms of audio output (e.g., playing stored media content), PMD 202 can revert to that operation upon exiting the radio application. Thus, for example, a user can toggle between listening to stored audio content and listening to live radio broadcasts.

It will be appreciated that this state diagram is illustrative. A radio control system can have any number and combination of states, and transitions between states can be defined differently from the examples described herein. Further, although the state diagram is described with reference to a "radio" application, it is understood that the same or similar states can be applied to any received broadcast in any medium (including, e.g., television, Internet broadcasting, etc.) and that embodiments are not limited to audio broadcasts or to any particular broadcast medium.

In some embodiments, accessory 220 can control at least some aspects of broadcast-receiving operations of PMD 202. For example, FIG. 4 is a table 400 showing commands that can be implemented in a PMD-specific communication protocol according to an embodiment of the present invention to allow an accessory to control broadcast-receiving operations. While the commands are described with reference to radio, it is understood that the same or similar commands can be applied in the context of any broadcast medium (including, e.g., television, Internet broadcasting, etc.) or content type and that embodiments are not limited to audio broadcasts or to any particular broadcast medium.

The SetNotify command can be sent by accessory 220 to PMD 202 to register for notifications of various changes to the PMD's state. In one embodiment, the payload of the SetNotify command includes a bitmask in which each bit is associated with a different class of notifications. For example, if PMD 202 has multiple functions, the notifications can be grouped into classes according to function (e.g., radio, television, stored media playback, telephony, data network access, navigation, etc.), and accessory 220 can selectively register for those classes that will affect its operation by setting appropriate bits in the bitmask. Thus, for example, an accessory that can control radio functionality can register for and receive radio notifications without also receiving, e.g., telephony or navigation notifications. In some embodiments, PMD 202 can return an acknowledgement (not explicitly shown in FIG. 4) to confirm receipt of the SetNotify command.

The EventNotify command can be sent by PMD 202 to accessory 220 to notify accessory 220 of a state transition or other event that may affect operation of the accessory. The payload can include a notification message indicating the type of event (e.g., using a byte code) and optionally other information that depends on the type of event. In some embodiments, PMD 202 sends notifications only for events in a class for which the accessory has registered using the SetNotify command. For example, in one embodiment, there can be defined a "radio" class of notifications. The radio class can include notifications corresponding to the LaunchRadio and QuitRadio events of FIG. 3, as well as notifications related to tagging and/or other radio-related events such as changing the station. For example, in some embodiments, notifications can be sent for each TagDetected event and each TagSuccess event shown in FIG. 3.

The RadioButtonStatus command can be sent by accessory 220 to PMD 202 to control radio operations. In one embodiment, the payload of the RadioButtonStatus command includes a bitmask in which each bit is associated with a different radio function. For example, bits can be associated with functions such as volume up, volume down, scan up, scan down, seek up, seek down, next preset, previous preset, and so on. One of the bits may be associated with a "collect tag" function that tells PMD 202 to store the tag for the currently playing track in storage device 206.

Accessory 220 can use the radio notifications in conjunction with the RadioButtonStatus command to facilitate tagging by a user. For example, the accessory can receive a notification of a TagDetected event and generate a signal to the user indicating availability of a tag, e.g., by lighting up Tag button 122 on remote control 106 of FIG. 1 or some other indicator light. The user can then activate Tag button 122 (or other input control of the accessory) if the user desires to tag the track (i.e., save the tag in storage medium 206), and the accessory can instruct the PMD to store the tag, e.g., by sending the RadioButtonStatus command with the "collect tag" bit set. This command can trigger a TagRequest event as shown in FIG. 3 The accessory can receive the TagSuccess notification and provide visual and/or audio confirmation to the user that the tag has been stored. In some embodiments, the accessory can also receive a notification of a TagFail event if one occurs. In response to such a notification, the accessory can alert the user that the tag was not stored or take other actions. For example, in some embodiments the accessory can use additional commands to determine the reason for the failure (which might be, e.g., sudden change in metadata availability, lack of storage space, etc.) and provide additional information to the user.

The EnterRadioMode and ExitRadioMode commands can be sent by accessory 220 to indicate that the user wants to start or stop listening to the radio. In some embodiments, PMD 202 can respond to the EnterRadioMode command by launching RF tuner application 209, which can result in a LaunchRadio mode transition as shown in FIG. 3. In some embodiments, PMD 202 can respond to the ExitRadioMode command by exiting RF tuner application 209, which can result in a QuitRadio mode transition as shown in FIG. 3. For other types of broadcasts, other commands can be used to toggle PMD 202 between a state where broadcast content is received and output and other states.

It will be appreciated that the commands described herein are illustrative and that variations and modifications are possible. For instance, in some embodiments, other commands can be used in addition to or instead of the RadioButtonStatus command to allow the accessory to control radio functions of the PMD. Examples of such commands are described in above-referenced application Ser. No. 12/553,850, and such commands can be used in connection with the notifications described herein. In some embodiments, commands may be provided to allow the accessory to request and receive status information or other information from the PMD, in addition to or instead of relying on the EventNotify command. For example, if the accessory receives a notification message indicating that the RF tuner has changed to another station, the accessory can request information about the new station (e.g., station frequency, call letters) using a different command. Further, in some embodiments, additional commands can be provided to allow the accessory to request and receive information from the PMD indicating the notification classes for which the accessory is currently registered.

Figure 5A:
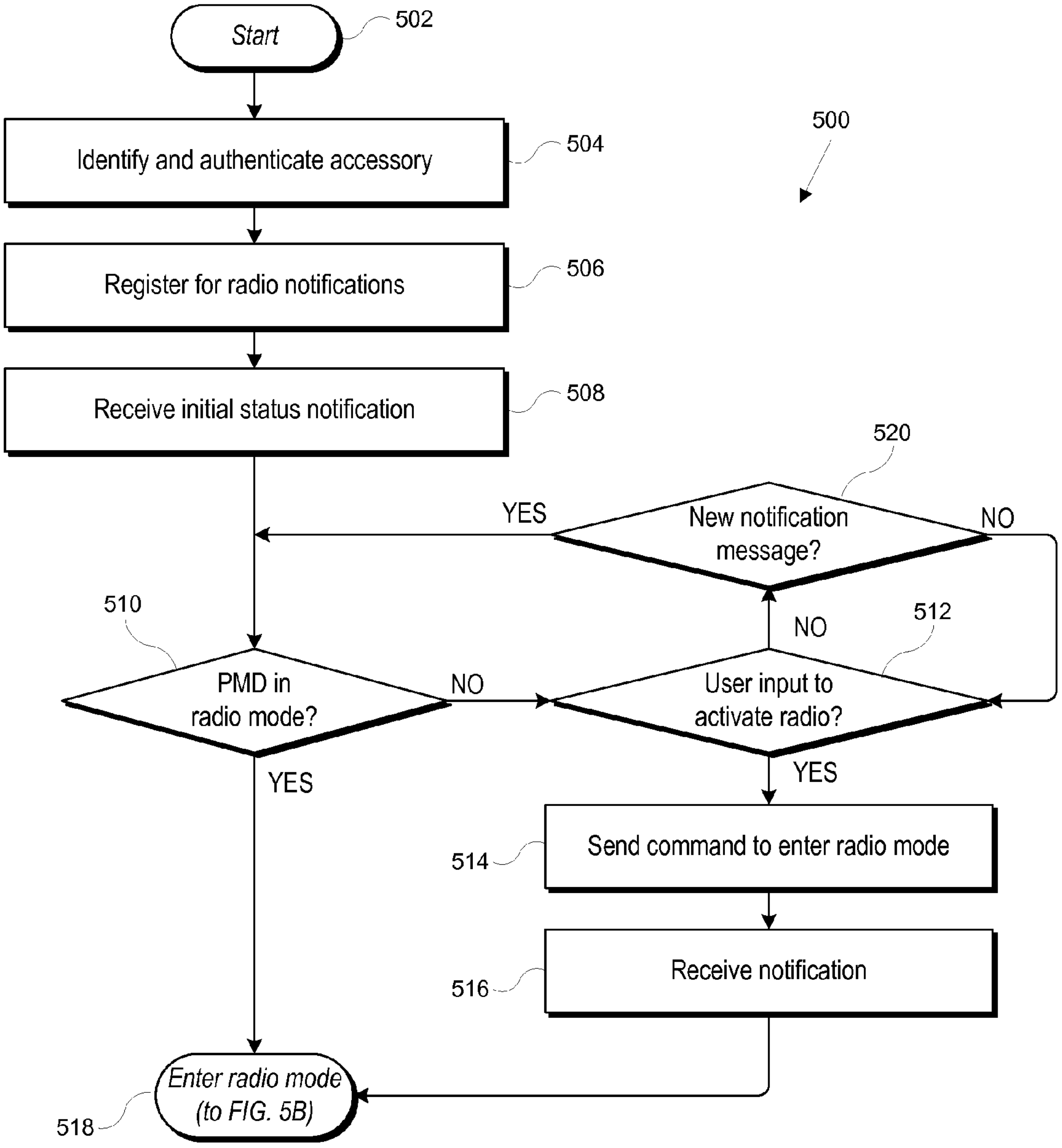
Figure 5B:
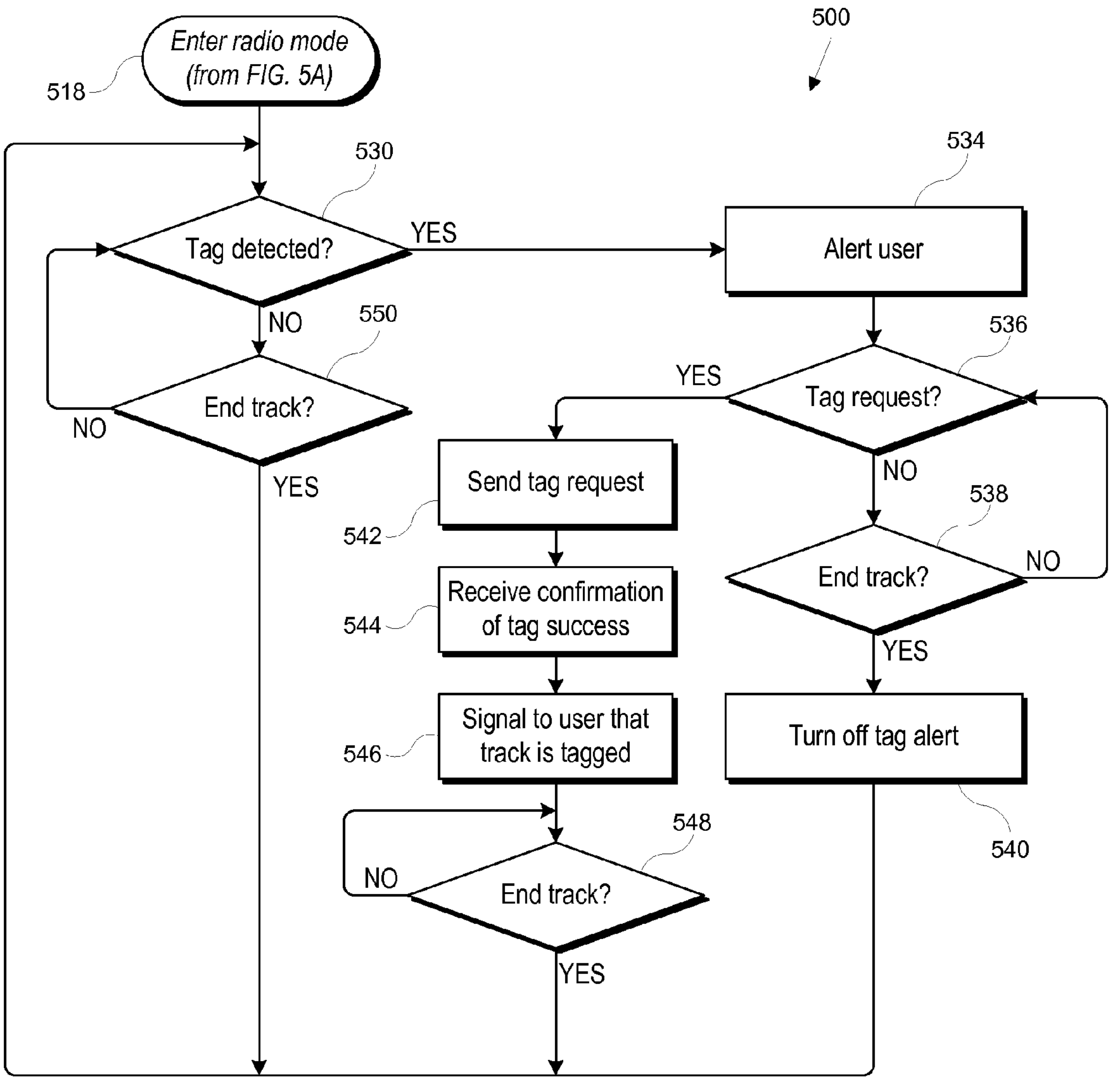

FIGS. 5A-5B are a flow diagram of a process 500 for controlling radio tagging (or tagging of other media broadcasts) by a PMD using an accessory according to an embodiment of the present invention. Process 500 can be implemented, e.g., in accessory 220 of FIG. 2. Process 500 begins (block 502 in FIG. 5A) when the accessory connects to a PMD (e.g., PMD 202 of FIG. 2). At block 504 the accessory can provide identifying information to PMD 202 and can also perform an authentication operation. At block 506, accessory 220 can register for radio notifications, e.g., by sending a SetNotify command with appropriate parameters as described above. At block 508, accessory 220 can receive an initial state notification (or other initial state information) from PMD 202. In some embodiments, during identification at block 504, accessory 220 can specify a preferred initial state for PMD 202 (e.g., whether PMD 202 should enter radio mode), and block 508 can include receiving confirmation that the preferred state has been entered.

At block 510, process 500 can determine whether the PMD is currently in radio mode (e.g., whether PMD 202 is in Radio Play mode 302 as shown in FIG. 3). If not, process 500 can wait until radio mode is entered. For example, in one embodiment, process 500 can check for user input requesting radio mode at block 512. If such input is received, a corresponding command to enter radio mode can be sent to PMD 202 at block 514 and a confirmation (e.g., a notification of the mode change) can be received at block 516, thereby entering radio mode (block 518). If user input requesting radio mode is not received at block 512, then at block 520, a notification of a state change can be detected if one is sent by PMD 202. If, at block 510, the notification indicates that PMD 202 is now in radio mode, process 500 proceeds to block 518. If the PMD is not in radio mode, process 500 can continue to wait until either user input or a notification from PMD 202 indicates a transition to radio mode.

As shown in FIG. 5B, once in radio mode (block 518), process 500 can receive a notification from PMD 202 that a tag has been detected for a current track. Block 530 detects whether such a notification is received. If so, then process 500 can alert the user that a tag is available at block 534. For example, accessory 220 can light an indicator or activate a "tag now" button, graphical user interface element, or other user input control associated with tagging. At block 536, user input requesting that the track be tagged (i.e., that the track-identifying metadata or a portion thereof be stored by PMD 202) can be detected. For example, accessory 220 can detect whether the user activates a "tag now" button or other input control associated with a tag request. If no such input is detected, then at block 538, process 500 can determine whether the end of the track was reached, e.g., whether PMD 202 has sent a notification of a NextTrack event. Process 500 can continue to wait until either user input requesting tagging of the track is received or the track ends. If the track ends at block 538 without the user having requested tagging of the track, then at block 540, process 500 can disable the tag-available alert and return to block 530 to determine whether a tag is available for the next track.

If, however, the user does request a tag at block 536, then at block 542, process 500 can generate a request to tag the track. For instance, accessory 220 can send a RadioButtonStatus command to PMD 202 with a bit set to indicate a tag request. At block 544, process 500 can receive confirmation that the tag has been stored (e.g., a notification of a TagSuccess event in FIG. 3). In some embodiments, at block 546, process 500 can provide a confirmation to the user that the track has been tagged, e.g., flashing an indicator light, disabling the tag available alert, playing a sound (e.g., a short beep), or the like. At block 548, process 500 can wait for the end of the track, which can be detected, e.g., via a notification from the PMD of a NextTrack event. In this embodiment, once a playing track has been tagged, the user is not given the option to tag that track again; other embodiments may allow for repeated tagging of the same track.

Referring again to block 530, tag information may not be available for all tracks. Where this is the case, process 500 can wait for the end of the track (block 550). It is possible that track-identifying metadata may become available while the track is playing, so process 500 can continue to monitor for notification of Tag Detected status while waiting for the track to end. As in other examples, the end of the track can be detected by detecting a NextTrack notification received from PMD 202.

Process 500 can continue in radio mode until PMD 202 exits radio mode, e.g., in response to user input. When PMD 202 exits radio mode, a QuitRadio notification can be sent to accessory 220. In response to this notification, process 500 can exit or return to block 510 (FIG. 5A) to wait for radio mode to be entered again.

It will be appreciated that process 500 is illustrative and that variations and modifications are possible. Steps described as sequential may be executed in parallel, order of steps may be varied, and steps may be modified, combined, added or omitted. For instance, in some embodiments, accessory 220 may also be able to receive other user input, e.g., requests to change the radio station or select a different program, adjust the volume, switch to a different radio band, or exit the PMD's radio application. Accessory 220 can process such input, and such processing can include sending corresponding RadioButtonStatus commands to PMD 202. In the interest of clarity, such processing has not been shown in FIG. 5. It is to be understood that accessory 220 can process user input and/or notifications from PMD 202 as they are received and can provide appropriate responses in real time to PMD 202 and/or the user. Further, while process 500 may make specific reference to radio, it is understood that similar operations can be applied to any broadcast medium (including, e.g., television, Internet broadcasting, etc.) and that embodiments are not limited to audio broadcasts or to any particular broadcast medium.

Figure 6A:
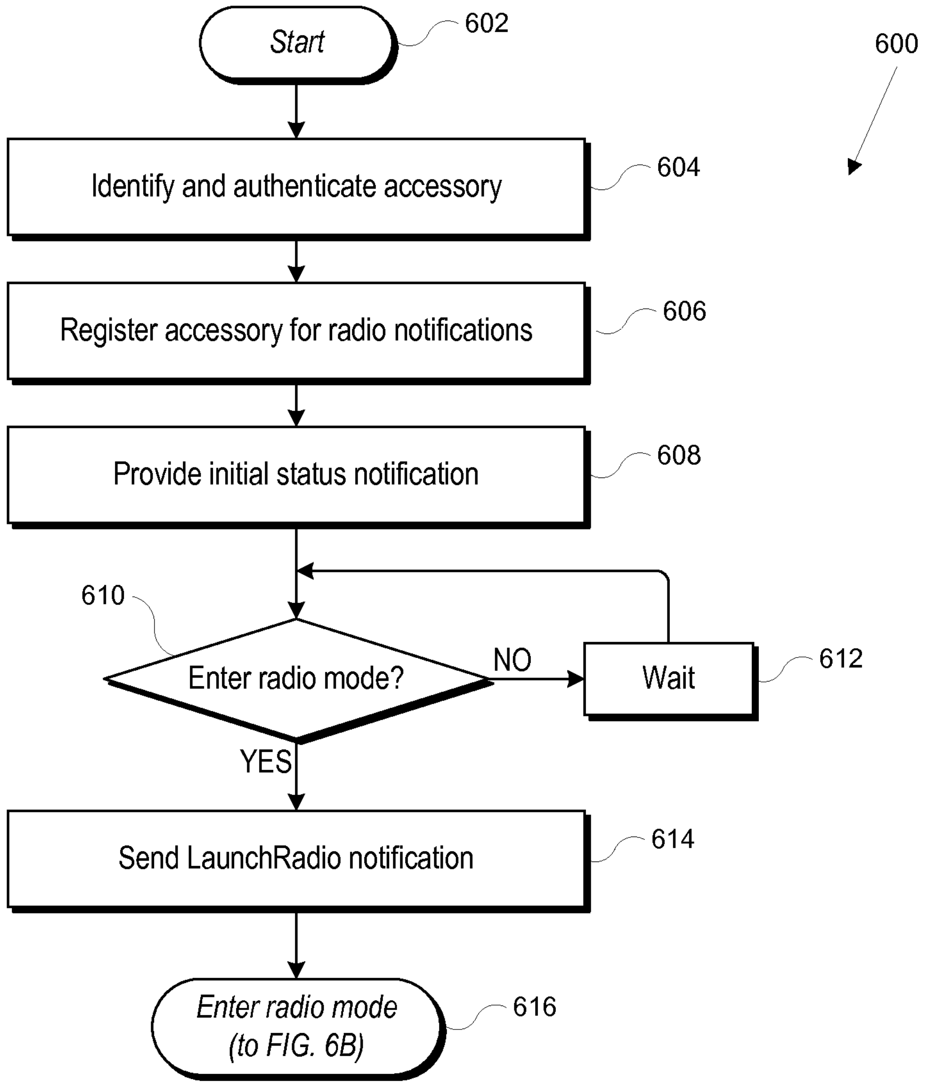
FIGS. 6A-6B together provide a flow diagram of a process for controlling tagging of radio tracks in a PMD according to an embodiment of the present invention.
Figure 6B:
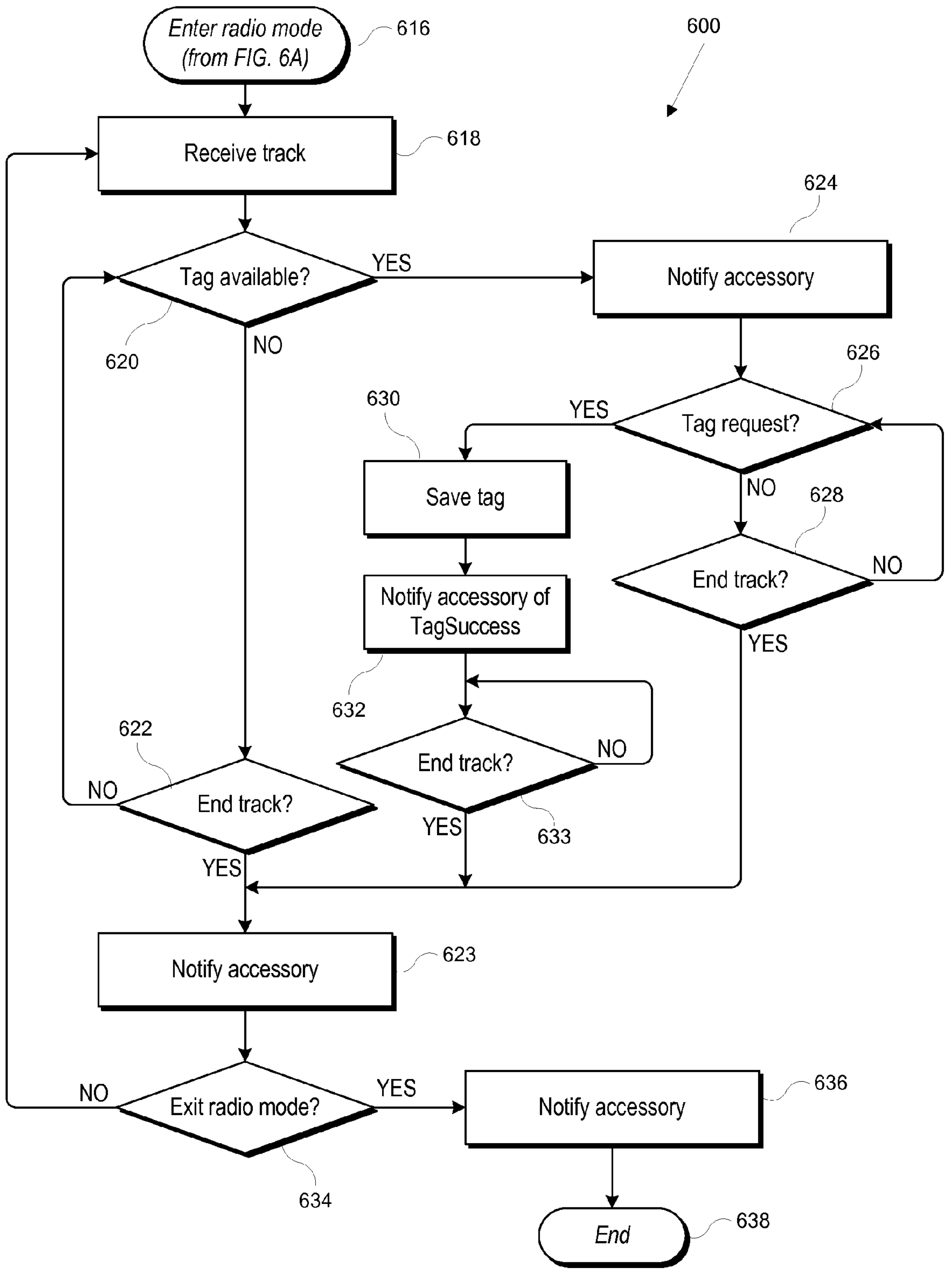

FIGS. 6A-6B are a flow diagram of a process 600 for controlling tagging of radio tracks (or tracks in other broadcast media) according to an embodiment of the present invention. Process 600 can be implemented, e.g., in PMD 202 communicating with accessory 220 of FIG. 2.

Process 600 begins (block 602) when the PMD connects to an accessory (e.g., accessory 220). At block 604 the PMD can receive identifying information from accessory 220 and can also perform an authentication operation. At block 606, PMD 202 can register accessory 220 for radio notifications. For example, accessory 220 can send a SetNotify command with appropriate parameters as described above to request one or more classes of event notifications, and block 606 can include processing this command to store the requested notification classes for later use. At block 608, PMD 202 can provide an initial status notification, including, e.g., a notification as to whether PMD 202 is currently in radio mode. At block 610, PMD 202 can determine whether it should enter (or is already in) radio mode. In some embodiments, PMD 202 can enter radio mode in response to a command from accessory 220 or in response to input from a user operating user interface 208 of PMD 202. In some embodiments, accessory 220 can indicate that PMD 202 should initialize in the radio mode, e.g., during identification at block 604. Any of these or other conditions can cause PMD 202 to enter radio mode. In some embodiments, entering radio mode includes launching a radio application installed on PMD 202 and can correspond to the LaunchRadio state transition in FIG. 3. If the radio mode is not entered immediately, process 600 can wait at block 612 until radio mode is to be entered; PMD 202 can perform other operations while process 600 waits.

Upon detecting that radio mode should be entered at block 610, process 600 sends a LaunchRadio notification to accessory 220 at block 614 and enters radio mode (block 616). Entering radio mode can include tuning to a station or program and delivering audio from the station or program to accessory 220 and/or to other output devices (e.g., speakers, headphones) that may be connected to PMD 202. Thus, as shown in FIG. 6B, at block 618, a track is received. At block 620, it is determined whether a tag is available for the track that is currently being received. For example, tag extraction engine 213 can detect the presence or absence of track-identifying metadata in the broadcast stream. If the metadata is not available, then process 600 can wait at block 622 for the end of the track. In some embodiments, process 600 can keep returning to block 620 during playback of a track in case a tag becomes available as the broadcast progresses.

If a tag is available at block 620, then tag extraction engine 213 can generate a signal that causes a TagDetected event (FIG. 3), and an EventNotify command indicating this state transition can be generated and sent to accessory 220 at block 624. Process 600 then checks for user input requesting a tag (block 626) or the end of the track (block 628). At block 626, a request for a tag can be detected, e.g., by detecting a RadioButtonStatus command received from the accessory with the "tag now" bit set. If such a request is received, then the tag is saved at block 630, and a notification to the accessory can be generated at block 632 to indicate the success (or failure) of saving the tag. After saving the tag, process 600 can proceed to block 633 to await the end of the track. In this embodiment, the same track would not be tagged twice while it is continuously playing.

When a track ends at any of block 622, block 628, or block 633, process 600 can notify the accessory at block 623, e.g., by sending an EventNotify command that indicates a Next-Track event or a transition to Tag Inactive state 304 (see FIG. 3). In some embodiments, the EventNotify command can also be used to provide a separate notification that tag data is no longer available; in other embodiments, the unavailability of tag data can be inferred by the accessory from the end-track notification.

Process 600 can determine whether radio mode is to be exited at block 634. If so, accessory 220 can be notified at block 636, and process 600 can exit at block 638. In some embodiments, instead of exiting, process 600 can return to block 610 (FIG. 6A) and wait to re-enter radio mode.

It will be appreciated that process 600 is illustrative and that variations and modifications are possible. Steps described as sequential may be executed in parallel, order of steps may be varied, and steps may be modified, combined, added or omitted. For instance, in some embodiments, PMD 202 may also be able to receive other user input while in radio mode, e.g., requests to change the radio station or select a different program, adjust the volume, switch to a different radio band, or exit the radio application. Such input can be received, e.g., from user interface 208 of PMD 202 and/or in the form of a RadioButtonStatus command or other command from accessory 220. PMD 202 can process such input as it is received, and where the input causes a state transition or other event, PMD 202 can notify accessory 220. Thus, for example, tuning to a different station or program can result in a NextTrack event (because the playing track changes with the station or program), and the accessory can be notified of this transition. In some embodiments, tuning to a different station or program can generate a different event (e.g., a "ProgramChange" event), and the accessory can be notified of this event in addition to or instead of the NextTrack event. Additionally, while process 600 may make specific reference to radio, it is understood that similar operations can be applied to any broadcast medium (including, e.g., television, Internet broadcasting, etc.) and that embodiments are not limited to audio broadcasts or to any particular broadcast medium.

Further, in some embodiments determining whether a track can be tagged may include more than detecting the availability of track-identifying metadata. For example, metadata for the current track from tag extraction engine 213 can be compared to metadata in stored tags 207; if the metadata for the current track matches a stored tag, the track can be treated as if a tag were unavailable, thereby preventing the user from tagging the same track on multiple hearings. Alternatively, comparing of the current track's metadata to stored tags can take place when the user requests tagging of the track. In either case, in some embodiments, the user can be alerted if it is determined that the track has already been tagged. For example, a message can be displayed on the PMD's user interface indicating that the track has previously been tagged, or the PMD can send an "AlreadyTagged" notification to the accessory, allowing the accessory to alert the user.

While the invention has been described with respect to specific embodiments, one skilled in the art will recognize that numerous modifications are possible. For example, a "PMD" as used herein refers generally to any portable device with any form of radio receiving capability; a broad range of functionality may be incorporated, including other media playback capability and/or two-way communication capability. Similarly, the term "accessory" can include any electronic device capable of communication with a PMD to control radio operations. "Radio" can include a variety of broadcast media including terrestrial radio (analog, digital, or hybrid digital), satellite radio, and Internet radio. Further, although certain embodiments have been described with reference to "radio," it is understood that the present disclosure can also be applied to other broadcast media and content types, including television or other video broadcasts (including over-the-air terrestrial broadcasts, satellite broadcasts, and cable broadcasts in analog or digital form), Internet broadcasts, and the like.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible device, or the program code may be provided separately from other devices (e.g., via Internet download).

Thus, although the invention has been described with respect to specific embodiments, it will be appreciated that the invention is intended to cover all modifications and equivalents within the scope of the following claims.

What is claimed is:

1. An accessory comprising:

a media device interface configured to exchange a plurality of commands with a portable media device;

a user interface configured to receive user input; and a controller coupled to the media device interface and the user interface, the controller being configured to interpret the received user input as instructions for invoking a functionality of a broadcast receiver of the portable media device and to instruct the media device interface to send a corresponding command from the plurality of commands to the portable media device, the controller being further configured to process commands received from the portable media device by the media device interface, wherein the plurality of commands includes:

a registration request command sendable by the accessory, the registration request command requesting the portable media device to register the accessory to receive notifications associated with one or more notification classes including a tagging class of notifications;

a button status command sendable by the accessory, the button status command including a button status bitmask, wherein different bits of the button status bitmask correspond to different functions of the broadcast receiver of the portable media device, the bits of the button status bitmask including a tag bit corresponding to an instruction to store track identifying metadata;

a notification command receivable by the accessory, the notification command including one of a plurality of event identifiers, wherein the plurality of event identifiers includes a first event identifier indicating detection of track identifying metadata for a current track being received by the broadcast receiver of the portable media device and a second event identifier indicating successful storing of the track identifying metadata at the portable media device;

a broadcast-receiving mode entry command sendable by the accessory to instruct the portable media device to enter a broadcast-receiving mode of operation; and a broadcast-receiving mode exit command sendable by the accessory to instruct the portable media device to exit the broadcast-receiving mode of operation.

2. The accessory of claim 1 further comprising:

a speaker, wherein the media device interface is further configured to receive an audio signal from the portable media device for delivery to the speaker.

3. The accessory of claim 1 wherein the user interface includes a tag control and wherein the controller is further configured such that, in response to user operation of the tag control, the controller instructs the media device interface to send the button status command with the tag bit active to the portable media device.

4. The accessory of claim 3 wherein the user interface is further configured such that the tag control is made operative in response to receiving a notification command including the first event identifier from the portable media device.

5. The accessory of claim 1 wherein the plurality of event identifiers further includes:

a third event identifier indicating that the portable media device has entered a broadcast-receiving mode of operation; and a fourth event identifier indicating that the portable media device has exited the broadcast-receiving mode of operation.

6. A method for operating a portable media device that is operable in a broadcast-receiving mode or another mode, the method comprising:

receiving a registration command from an accessory, the registration command requesting the portable media device to register the accessory for receiving notifications for one or more classes of notification, wherein the one or more classes include a tagging class of notifications, wherein the tagging class of notifications comprises a tag notification indicating that track identifying metadata is available for a particular track;

registering the accessory to receive notifications associated with the tagging class of notifications specified in the registration command;

receiving a track of a broadcast at the portable media device;

providing an audio signal corresponding to the track to the accessory;

at the portable media device, detecting track identifying metadata associated with the track;

in response to detecting the track-identifying metadata associated with the track, sending the tag notification to the accessory registered with the portable media device, the tag notification indicating that the track identifying metadata is available for the track;

receiving, from the accessory, an instruction to tag the track;

in response to the instruction to tag the track, storing the track identifying metadata associated with the track in a storage medium of the portable media device;

sending a success notification to the accessory, the success notification indicating that the track identifying metadata associated with the track has been stored in the storage medium;

at a time when the portable media device is operating in the other mode, receiving, from the accessory, an instruction to enter the broadcast-receiving mode;

switching to the broadcast-receiving mode in response to the instruction to enter the broadcast-receiving mode;

at a time when the portable media device is operating in the broadcast-receiving mode, receiving, from the accessory, an instruction to exit the broadcast-receiving mode; and switching to the other mode in response to the instruction to exit the broadcast-receiving mode.

7. The method of claim 6 further comprising: detecting an end of the track; and in response to detecting the end of the track, sending an end-track notification to the accessory.

8. The method of claim 7 wherein the end-track notification includes a notification that the track identifying metadata is no longer available.

9. The method of claim 6 wherein the instruction to tag the track comprises a command and an associated bitmask, wherein different bits of the bitmask correspond to different functions of a broadcast receiver of the portable media device, and wherein the bits of the bitmask include a tag bit corresponding to the instruction to tag the track.

10. A portable media device comprising:

a broadcast receiver configured to receive broadcast media content and to extract a content signal and track identifying metadata from the received broadcast media content;

an accessory interface configured to exchange commands, from a plurality of commands, with an accessory;

a storage device configured to store data; and a processor coupled to the broadcast receiver and the accessory interface, the processor being configured to process the commands exchanged via the accessory interface and execute an application program to control the broadcast receiver, wherein the plurality of commands includes:

a button status command receivable by the portable media device, the button status command including a button status bitmask, wherein the button status bitmask includes a tag bit indicative of an instruction to store at least a portion of the metadata extracted from the received broadcast media content, and wherein the processor is further configured such that, in response to receiving the button status command with the tag bit set, the processor stores at least a portion of the track identifying metadata extracted by the broadcast receiver as a tag in the storage device;

a notification command sendable by the portable media device in response to detecting an event, the notification command including an event identifier corresponding to the detected event, wherein the detected event is one of a plurality of events that include detection of track identifying metadata for a current track being received by the broadcast receiver of the portable media device and successful storing of the track identifying metadata;

a registration command receivable from the accessory, the registration command indicating event identifiers of a set of the plurality of events are to be sent to the accessory using the notification command;

an enter broadcast mode command receivable by the portable media device, the enter broadcast mode command instructing the portable media device to launch the application program; and an exit broadcast mode command receivable by the portable media device, the exit broadcast mode command instructing the portable media device to quit the application program.

11. The portable media device of claim 10, wherein the plurality of events further include launching the application program and quitting the application program.

12. The portable media device of claim 10 wherein the broadcast receiver includes a radio tuner.

13. The portable media device of claim 12 wherein the radio tuner is further configured to receive a radio broadcast on at least one of an FM radio band, an AM radio band, or a satellite radio band.

14. The portable media device of claim 10 wherein the broadcast receiver is configured to receive an Internet broadcast.

15. The portable media device of claim 10 wherein the broadcast receiver is configured to receive a television broadcast.

16. The portable media device of claim 10 wherein the accessory interface is further configured to transmit the content signal from the broadcast receiver to the accessory.

17. A method for controlling a portable media device having a broadcast receiver, the method comprising, by an accessory communicatively coupled to the portable media device:

receiving a first notification from the portable media device, the first notification indicating whether the portable media device is operating in a broadcast-receiving mode or a stored media playback mode;

sending a mode switching command to the portable media device in response to the notification, wherein the mode switching command instructs the portable media device to switch between the broadcast-receiving mode and the stored media playback mode;

in response to the mode switching command, receiving a second notification from the portable media device, the second notification also indicating whether the portable media device is operating in the broadcast-receiving mode or the stored media playback mode, wherein the second notification reflects an effect of the mode switching command on the portable media device; and prior to receiving the first notification, sending a registration command to the portable media device, the registration command instructing the portable media device to register the accessory to receive one or more classes of notifications including a tagging class of notifications associated with a broadcast-receiving application of the portable media device, wherein the first notification and the second notification are included in the tagging class of notifications associated with the broadcast-receiving application.

18. The method of claim 17 wherein the tagging class of notifications associated with the broadcast-receiving application further includes a tag notification indicating that track-identifying metadata is available for a currently playing track of a broadcast, the method further comprising, by the accessory:

while the portable media device is operating in the broadcast-receiving mode and playing a track, receiving the tag notification from the portable media device;

in response to the tag notification, determining whether a user requests to tag the track; and in the event that the user requests to tag the track, sending a tagging command to the portable media device, the tagging command instructing the portable media device to tag the track.

19. A non-transitory machine-readable medium having executable instructions to cause one or more processing units to perform a method for operating a portable media device, the portable media device operable in a broadcast-receiving mode or another mode, the method comprising:

receiving a registration command from an accessory, the registration command requesting the portable media device to register the accessory for receiving notifications for one or more classes of notification, wherein the one or more classes include a tagging class of notifications, wherein the tagging class of notifications comprises a tag notification indicating that track identifying metadata is available for a particular track;

registering the accessory to receive notifications associated with the tagging class of notifications specified in the registration command;

receiving a track of a broadcast at the portable media device;

providing an audio signal corresponding to the track to the accessory;

at the portable media device, detecting track identifying metadata associated with the track;

in response to detecting the track-identifying metadata associated with the track, sending the tag notification to the accessory registered with the portable media device, the tag notification indicating that the track identifying metadata is available for the track;

receiving, from the accessory, an instruction to tag the track;

in response to the instruction to tag the track, storing the track identifying metadata associated with the track in a storage medium of the portable media device;

sending a success notification to the accessory, the success notification indicating that the track identifying metadata associated with the track has been stored in the storage medium;

at a time when the portable media device is operating in the other mode, receiving, from the accessory, an instruction to enter the broadcast-receiving mode;

switching to the broadcast-receiving mode in response to the instruction to enter the broadcast-receiving mode;

at a time when the portable media device is operating in the broadcast-receiving mode, receiving, from the accessory, an instruction to exit the broadcast-receiving mode; and switching to the other mode in response to the instruction to exit the broadcast-receiving mode.

20. The non-transitory machine-readable medium of claim 19, wherein the method further comprising:

detecting an end of the track; and in response to detecting the end of the track, sending an end-track notification to the accessory.

21. The non-transitory machine-readable medium of claim 20, wherein the end-track notification includes a notification that the track identifying metadata is no longer available.

22. The non-transitory machine-readable medium of claim 19, wherein the instruction to tag the track comprises a command and an associated bitmask, wherein different bits of the bitmask correspond to different functions of a broadcast receiver of the portable media device, and wherein the bits of the bitmask include a tag bit corresponding to the instruction to tag the track.

23. A non-transitory machine-readable medium having executable instructions to cause one or more processing units to perform a method for controlling a portable media device having a broadcast receiver, the method comprising, by an accessory communicatively coupled to the portable media device:

receiving a first notification from the portable media device, the first notification indicating whether the portable media device is operating in a broadcast-receiving mode or a stored media playback mode;

sending a mode switching command to the portable media device in response to the notification, wherein the mode switching command instructs the portable media device to switch between the broadcast-receiving mode and the stored media playback mode;

in response to the mode switching command, receiving a second notification from the portable media device, the second notification also indicating whether the portable media device is operating in the broadcast-receiving mode or the stored media playback mode, wherein the second notification reflects an effect of the mode switching command on the portable media device; and prior to receiving the first notification, sending a registration command to the portable media device, the registration command instructing the portable media device to register the accessory to receive one or more classes of notifications including a tagging class of notifications associated with a broadcast-receiving application of the portable media device, wherein the first notification and the second notification are included in the tagging class of notifications associated with the broadcast-receiving application.

24. The non-transitory machine-readable medium of claim 23, wherein the tagging class of notifications associated with the broadcast-receiving application further includes a tag notification indicating that track-identifying metadata is available for a currently playing track of a broadcast, the method further comprising, by the accessory:

while the portable media device is operating in the broadcast-receiving mode and playing a track, receiving the tag notification from the portable media device;

in response to the tag notification, determining whether a user requests to tag the track; and in the event that the user requests to tag the track, sending a tagging command to the portable media device, the tagging command instructing the portable media device to tag the track.

* * * * *